US012038029B2

(12) United States Patent
Boo

(10) Patent No.: US 12,038,029 B2
(45) Date of Patent: Jul. 16, 2024

(54) MECHANICAL LOCKING SYSTEM FOR PANELS

(71) Applicant: Välinge Innovation AB, Viken (SE)

(72) Inventor: Christian Boo, Kågeröd (SE)

(73) Assignee: Välinge Innovation AB, Viken (SE)

(*) Notice: Subject to any disclaimer, the term of this patent is extended or adjusted under 35 U.S.C. 154(b) by 264 days.

(21) Appl. No.: 17/370,521

(22) Filed: Jul. 8, 2021

(65) Prior Publication Data
US 2022/0018373 A1 Jan. 20, 2022

(30) Foreign Application Priority Data

Jul. 17, 2020 (SE) .................................. 2050905-5

(51) Int. Cl.
*F16B 12/46* (2006.01)
*A47B 47/04* (2006.01)
(Continued)

(52) U.S. Cl.
CPC ............ *F16B 12/46* (2013.01); *A47B 47/042* (2013.01); *F16B 12/125* (2013.01); *F16B 12/24* (2013.01);
(Continued)

(58) Field of Classification Search
CPC ........ F16B 12/46; F16B 12/125; F16B 12/24; A47B 47/042; A47B 2230/0081; A47B 2230/0096
See application file for complete search history.

(56) References Cited

U.S. PATENT DOCUMENTS 3,305,992 A * 2/1967 Steed ................... B27F 1/02
52/784.14
3,951,187 A * 4/1976 Chisum ................ B27C 7/005
144/368
(Continued)

FOREIGN PATENT DOCUMENTS

WO WO 2007/015669 A2 2/2007
WO WO 2007/015669 A3 2/2007
(Continued)

OTHER PUBLICATIONS

U.S. Appl. No. 17/674,262, Johan Svensson and Peter Derelöv, filed Feb. 17, 2022.
(Continued)

*Primary Examiner* — Gisele D Ford
(74) *Attorney, Agent, or Firm* — Boone IP Law

(57) ABSTRACT

A set including a first panel with a first main plane, a second panel with a second main plane and a mechanical locking device configured for locking the first panel to the second panel is described. The first main plane is arranged essentially perpendicular to the second main plane in a locked position of the first panel and the second panel. The mechanical locking device includes a first tongue and a groove surface at a first panel surface, and a locking groove and an edge surface at a second edge. The first tongue includes a first locking surface, the locking groove includes a second locking surface, the first locking surface is configured to interact with the second locking surface in the locked position, wherein the first tongue and/or the locking groove is/are flexible for facilitating locking of the first panel to the second panel.

23 Claims, 15 Drawing Sheets

(51) Int. Cl.
*F16B 12/12* (2006.01)
*F16B 12/24* (2006.01)
(52) U.S. Cl.
CPC ............ *A47B 2230/0081* (2013.01); *A47B 2230/0096* (2013.01)

(56) References Cited

U.S. PATENT DOCUMENTS

| | | | | |
|---|---|---|---|---|
| 4,168,675 | A | * | 9/1979 | Chisum .................... B27M 3/00 118/316 |
| 4,184,525 | A | * | 1/1980 | Helmes .................... B27F 1/10 144/201 |
| 4,674,923 | A | * | 6/1987 | Ogilvie .................. B23C 5/2213 144/237 |
| 5,611,637 | A | * | 3/1997 | Brustle .................... A47B 95/00 312/348.4 |
| 5,658,086 | A | * | 8/1997 | Brokaw .................. A47B 13/003 403/DIG. 7 |
| 5,810,505 | A | * | 9/1998 | Henriott .................. F16B 12/14 312/265.5 |
| 5,970,675 | A | * | 10/1999 | Schray .................... E04B 1/6137 403/189 |
| 6,045,290 | A | * | 4/2000 | Nocievski ............... F16B 12/46 403/231 |
| 7,451,535 | B2 | * | 11/2008 | Wells .................... A47B 47/042 312/265.5 |
| 8,887,468 | B2 | | 11/2014 | Håkansson et al. |
| 9,175,703 | B2 | * | 11/2015 | Maertens ............. A47B 96/206 |
| 9,375,085 | B2 | | 6/2016 | Derelöv |
| 9,538,842 | B2 | * | 1/2017 | Håkansson ........... F16B 5/0056 |
| 9,655,442 | B2 | * | 5/2017 | Boo ........................ F16B 12/26 |
| 9,714,672 | B2 | * | 7/2017 | Derelöv .................. F16B 12/46 |
| 9,723,923 | B2 | | 8/2017 | Derelöv |
| 9,726,210 | B2 | * | 8/2017 | Derelöv .................. F16B 12/46 |
| 9,945,121 | B2 | * | 4/2018 | Derelöv .................. E04C 2/40 |
| 10,034,541 | B2 | | 7/2018 | Boo et al. |
| 10,202,996 | B2 | | 2/2019 | Håkansson et al. |
| 10,415,613 | B2 | | 9/2019 | Boo |
| 10,448,739 | B2 | | 10/2019 | Derelöv et al. |
| 10,451,097 | B2 | | 10/2019 | Brännström et al. |
| 10,486,245 | B2 | | 11/2019 | Fridlund |
| 10,506,875 | B2 | | 12/2019 | Boo et al. |
| 10,544,818 | B2 | | 1/2020 | Fridlund |
| 10,548,397 | B2 | | 2/2020 | Derelöv et al. |
| D885,171 | S | * | 5/2020 | Koelling ................ F16B 12/22 D8/382 |
| 10,669,716 | B2 | | 6/2020 | Derelöv |
| 10,670,064 | B2 | | 6/2020 | Derelöv |
| 10,724,564 | B2 | * | 7/2020 | Derelöv ............. A47B 96/201 |
| 10,731,688 | B2 | | 8/2020 | Brännström et al. |
| 10,736,416 | B2 | * | 8/2020 | Derelöv ............. A47B 47/042 |
| 10,830,266 | B2 | * | 11/2020 | Fridlund .................. B27M 1/08 |
| 10,830,268 | B2 | | 11/2020 | Boo |
| 10,844,891 | B2 | * | 11/2020 | Maertens ............... F16B 12/12 |
| 10,871,179 | B2 | | 12/2020 | Håkansson et al. |
| 10,876,562 | B2 | * | 12/2020 | Pervan .................. A47B 47/042 |
| 10,876,563 | B2 | | 12/2020 | Derelöv et al. |
| 10,968,936 | B2 | * | 4/2021 | Boo ........................ A47B 88/43 |
| 11,076,691 | B2 | * | 8/2021 | Boo .................... A47B 47/0075 |
| 11,083,287 | B2 | | 8/2021 | Boo et al. |
| 11,098,484 | B2 | | 8/2021 | Derelöv |
| 11,137,007 | B2 | | 10/2021 | Fridlund |
| 11,204,051 | B2 | * | 12/2021 | Brännström ............. F16B 12/44 |
| 11,246,415 | B2 | | 2/2022 | Derelöv et al. |
| 11,272,783 | B2 | | 3/2022 | Derelöv |
| 11,448,252 | B2 | * | 9/2022 | Boo ........................ F16B 12/26 |
| 11,506,235 | B2 | * | 11/2022 | Fransson ............... F16B 12/22 |
| 11,536,307 | B2 | * | 12/2022 | Derelöv ................ F16B 12/125 |
| 11,614,114 | B2 | * | 3/2023 | Derelöv ............... A47B 96/201 403/217 |
| 2002/0102138 | A1 | | 8/2002 | Iinuma .................... B27F 1/16 407/42 |
| 2010/0189492 | A1 | * | 7/2010 | Green .................... F16B 12/22 312/352 |
| 2011/0085853 | A1 | * | 4/2011 | Liu ........................ F16B 12/22 403/381 |
| 2012/0279161 | A1 | * | 11/2012 | Hakansson ........... F16B 5/0614 52/588.1 |
| 2013/0071172 | A1 | * | 3/2013 | Maertens ............. F16B 5/0016 403/376 |
| 2015/0035422 | A1 | | 2/2015 | Håkansson et al. |
| 2015/0078807 | A1 | * | 3/2015 | Brannström ........... F16B 12/44 403/219 |
| 2015/0078819 | A1 | | 3/2015 | Derelöv et al. |
| 2015/0196118 | A1 | | 7/2015 | Derelöv |
| 2015/0198191 | A1 | | 7/2015 | Boo |
| 2016/0007751 | A1 | | 1/2016 | Derelöv |
| 2016/0174704 | A1 | | 6/2016 | Boo et al. |
| 2016/0270531 | A1 | | 9/2016 | Derelöv |
| 2017/0079433 | A1 | | 3/2017 | Derelöv et al. |
| 2017/0089379 | A1 | * | 3/2017 | Pervan .................... A47B 63/00 |
| 2017/0097033 | A1 | | 4/2017 | Håkansson et al. |
| 2017/0159291 | A1 | * | 6/2017 | Derelöv .................. A47B 47/04 |
| 2017/0208938 | A1 | | 7/2017 | Derelöv et al. |
| 2017/0227031 | A1 | | 8/2017 | Boo |
| 2017/0227032 | A1 | * | 8/2017 | Fridlund ............... F16B 5/0044 |
| 2017/0227035 | A1 | | 8/2017 | Fridlund |
| 2017/0234346 | A1 | | 8/2017 | Fridlund |
| 2017/0298973 | A1 | | 10/2017 | Derelöv |
| 2017/0360193 | A1 | | 12/2017 | Boo et al. |
| 2018/0080488 | A1 | | 3/2018 | Derelöv |
| 2018/0087552 | A1 | | 3/2018 | Derelöv et al. |
| 2018/0112695 | A1 | * | 4/2018 | Boo ........................ F16B 12/24 |
| 2018/0119717 | A1 | * | 5/2018 | Derelöv ............. A47B 47/0075 |
| 2018/0202160 | A1 | | 7/2018 | Derelöv |
| 2018/0310707 | A1 | * | 11/2018 | Berloni .................. F16B 12/10 |
| 2018/0328396 | A1 | * | 11/2018 | Fransson ............... F16B 12/24 |
| 2019/0113061 | A1 | | 4/2019 | Håkansson et al. |
| 2019/0166989 | A1 | | 6/2019 | Boo et al. |
| 2019/0191870 | A1 | | 6/2019 | Derelöv |
| 2019/0195256 | A1 | | 6/2019 | Derelöv |
| 2019/0269240 | A1 | * | 9/2019 | Bobillier ............... F16B 12/24 |
| 2019/0289999 | A1 | | 9/2019 | Derelöv et al. |
| 2019/0320793 | A1 | * | 10/2019 | Boo ........................ A47B 97/00 |
| 2019/0323532 | A1 | * | 10/2019 | Boo ........................ F16B 12/24 |
| 2019/0323533 | A1 | * | 10/2019 | Boo ........................ F16B 12/20 |
| 2019/0323534 | A1 | * | 10/2019 | Derelöv .................. F16B 12/26 |
| 2019/0323535 | A1 | | 10/2019 | Derelöv |
| 2020/0003242 | A1 | | 1/2020 | Brännström et al. |
| 2020/0055126 | A1 | | 2/2020 | Fridlund |
| 2020/0069048 | A1 | * | 3/2020 | Derelöv ............... A47B 47/042 |
| 2020/0069049 | A1 | * | 3/2020 | Derelöv .................. F16B 12/20 |
| 2020/0102978 | A1 | | 4/2020 | Fridlund |
| 2020/0121076 | A1 | | 4/2020 | Derelöv et al. |
| 2020/0214447 | A1 | | 7/2020 | Derelöv et al. |
| 2020/0300284 | A1 | | 9/2020 | Pervan |
| 2020/0337455 | A1 | | 10/2020 | Boo et al. |
| 2020/0340513 | A1 | | 10/2020 | Derelöv |
| 2021/0001662 | A1 | * | 1/2021 | Miclo ................ E04F 15/02038 |
| 2021/0079650 | A1 | | 3/2021 | Derelöv |
| 2021/0148392 | A1 | | 5/2021 | Brännström et al. |
| 2021/0180630 | A1 | | 6/2021 | Bruno et al. |
| 2021/0190112 | A1 | | 6/2021 | Derelöv |
| 2021/0207635 | A1 | | 7/2021 | Håkansson et al. |
| 2021/0222716 | A1 | | 7/2021 | Derelöv et al. |
| 2021/0262507 | A1 | | 8/2021 | Svensson et al. |
| 2021/0262508 | A1 | | 8/2021 | Svensson et al. |
| 2021/0276108 | A1 | | 9/2021 | Derelöv et al. |
| 2021/0285480 | A1 | | 9/2021 | Derelöv et al. |
| 2021/0381251 | A1 | | 12/2021 | Svensson |
| 2022/0049735 | A1 | | 2/2022 | Meijer |
| 2022/0152864 | A1 | * | 5/2022 | De Rick ................ B27D 5/006 |
| 2023/0346120 | A1 | * | 11/2023 | Markovski ............ B27D 5/006 |

FOREIGN PATENT DOCUMENTS

| | | |
|---|---|---|
| WO | WO 2012/154113 A1 | 11/2012 |
| WO | WO 2014/209213 A1 | 12/2014 |
| WO | WO 2015/105449 A1 | 7/2015 |

(56) References Cited

FOREIGN PATENT DOCUMENTS

| WO | WO 2015/105451 A1 | 7/2015 |
| WO | WO 2019/203720 A1 | 10/2019 |

OTHER PUBLICATIONS

Svensson, Johan, et al., U.S. Appl. No. 17/674,262 entitled "Mechanical Connection Arrangement for Panels," filed in the U.S. Patent and Trademark Office Feb. 17, 2022.
U.S. Appl. No. 16/386,732, Christian Boo, filed Apr. 17, 2019, (Cited herein as US Patent Application Publication No. 2019/0323532 A1 of Oct. 24, 2019).
U.S. Appl. No. 16/386,810, Christian Boo, filed Apr. 17, 2019, (Cited herein as US Patent Application Publication No. 2019/0323533 A1 of Oct. 24, 2019).
U.S. Appl. No. 16/553,325, Peter Derelöv and Johan Svensson, filed Aug. 28, 2019, (Cited herein as US Patent Application Publication No. 2020/0069048 A1 of Mar. 5, 2020).
U.S. Appl. No. 16/553,350, Peter Derelöv and Johan Svensson, filed Aug. 28, 2019, (Cited herein as US Patent Application Publication No. 2020/0069049 A1 of Mar. 5, 2020).
U.S. Appl. No. 16/856,765, Peter Derelöv, filed Apr. 23, 2020, (Cited herein as US Patent Application Publication No. 2020/0340513 A1 of Oct. 29, 2020).
U.S. Appl. No. 17/154,344, Peter Derelöv and Johan Svensson, filed Jan. 21, 2021, (Cited herein as US Patent Application Publication No. 2021/0222716 A1 of Jul. 22, 2021).
U.S. Appl. No. 17/173,823, Peter Derelöv and Johan Svensson, filed Feb. 11, 2021, (Cited herein as US Patent Application Publication No. 2021/0276108 A1 of Sep. 9, 2021).
U.S. Appl. No. 17/185,428, Johan Svensson and Peter Derelöv, filed Feb. 25, 2021, (Cited herein as US Patent Application Publication No. 2021/0262508 A1 of Aug. 26, 2021).
U.S. Appl. No. 17/185,403, Johan Svensson and Peter Derelöv, filed Feb. 25, 2021, (Cited herein as US Patent Application Publication No. 2021/0262507 A1 of Aug. 26, 2021).
U.S. Appl. No. 17/588,733, Peter Derelöv and Johan Svensson, filed Jan. 31, 2022.
International Search Report/Written Opinion dated Aug. 10, 2021 in PCT/SE2021/050697, ISA/SE, Patent-och registreringsverket, Stockholm, SE, 11 pages.
Derelöv, Peter, et al., U.S. Appl. No. 17/588,733 entitled "Arrangements for Preparing of Furniture Product," filed in the U.S. Patent and Trademark Office Jan. 31, 2022.

* cited by examiner

MECHANICAL LOCKING SYSTEM FOR PANELS

CROSS REFERENCE TO RELATED APPLICATIONS

The present application claims the benefit of Swedish Application No. 2050905-5, filed on Jul. 17, 2020. The entire contents of Swedish Application No. 2050905-5 are hereby incorporated herein by reference in their entirety.

TECHNICAL FIELD

Embodiments of the present disclosure relate to panels configured to be locked together with a mechanical locking device. The panels may be panels that may be assembled and locked together to obtain a furniture product, such as a bookshelf, a cupboard, a wardrobe, a box, a drawer or a furniture component and may thereafter be dismantled. The mechanical locking device may comprise a flexible tongue.

TECHNICAL BACKGROUND

A furniture product provided with a mechanical locking device is known in the art, as evidenced by WO2012/154113 or WO2015/105449. The furniture products described comprise a first panel connected perpendicularly to a second panel by a mechanical locking device comprising a flexible tongue in an insertion groove.

The above description of various known aspects is the applicant's characterization of such, and is not an admission that any of the above description is considered as prior art.

Embodiments of the present disclosure address a need to provide panels that can be assembled and dismantled, which panels can be easily manufactured.

SUMMARY

It is an object of certain aspects of the present disclosure to provide an improvement over the above described techniques and known art. A specific objective is to improve the ease of manufacture of panels, such as building panels or furniture panels, to be locked together by a mechanical locking device. The panels may be a part of an assembled product, such as furniture product, such as a furniture component, a drawer, a cupboard, a bookshelf, a wardrobe, a kitchen fixture, or a box.

A further object of at least certain aspects of the present disclosure is to facilitate assembling and disassembling of panels configured to be assembled with a locking device that is easy to manufacture.

A further object of at least certain aspects of the present disclosure is to facilitate assembling of panels configured to be assembled with a locking device that is easy to use and install and which reduces the risk of incorrect installation thereof.

A further object of at least certain aspects of the present disclosure is to facilitate assembling of panels configured to be assembled in a more stable and aesthetic way.

At least some of these and other objects and advantages that will be apparent from the description have been achieved by a set of panels comprising a first panel with a first main plane, a second panel with a second main plane and a mechanical locking device configured for locking the first panel to the second panel, wherein the first panel comprises a first edge and a first panel surface and the second panel comprises a second edge and a second panel surface, and the first main plane is arranged essentially perpendicular to the second main plane in a locked position of the first panel and the second panel, wherein the mechanical locking device comprises a first tongue and a groove surface at the first panel surface, and a locking groove and an edge surface at the second edge, the first tongue comprises a first locking surface, the locking groove comprises a second locking surface, the first locking surface is configured to interact with the second locking surface in the locked position, wherein the first tongue and/or the locking groove is/are flexible for facilitating locking of the first panel to the second panel, a longitudinal axis of the first tongue extends at a first angle from the first main plane, the groove surface extends at a second angle from the first main plane, the second locking surface extends at a third angle from the second main plane, the edge surface extends at a fourth angle from the second main plane, and wherein the first angle is the second angle and/or the third angle is the fourth angle.

According to an aspect the first angle is within the range of about 25° to about 45°, or within the range of about 35° to about 40°. These angular ranges facilitate the manufacturing of the locking device.

According to an aspect the second angle is within the range of about 25° to about 45°, or within the range of about 35° to about 40°. These angular ranges facilitate the manufacturing of the locking device.

According to an aspect the third angle is within the range of about 65° to about 45°, or within the range of about 55° to about 50°. These angular ranges facilitate the manufacturing of the locking device.

According to an aspect the fourth angle is within the range of about 65° to about 45°, or within the range of about 55° to about 50°. These angular ranges facilitate the manufacturing of the locking device.

According to an aspect the first tongue is a flexible tongue.

According to an aspect the first tongue is positioned in a first insertion groove.

According to an aspect the flexible tongue may have longitudinal shape and the first insertion groove may have a longitudinal shape, wherein the flexible tongue is positioned in the first insertion groove with its length direction parallel with the length direction of the first insertion groove.

According to an aspect the mechanical locking device further comprises at least one rod-shaped element at the first panel surface and/or at the second edge, and at least one second insertion groove at the opposite first panel surface and/or the opposite second edge, and wherein the rod-shaped element is configured to be inserted into the second insertion groove in the locked position.

According to an aspect the rod-shaped element is arranged in a rod element groove.

According to an aspect the rod element groove is a drill hole.

According to an aspect the insertion groove is a drill hole.

According to an aspect the drill hole is a bottom-ended drill hole.

According to an aspect the groove surface, the edge surface and/or the second locking surface is/are a milled surface.

According to an aspect a difference between the first angle and the second angle is between 0° and 10°.

According to an aspect a difference between the third angle and the fourth angle is between 0° and 10°.

According to an aspect the second edge of the second panel comprises a second tongue and wherein the second tongue comprises a flexing groove.

According to a further aspect, provided is also a method of providing a first panel and/or a second panel with a mechanical locking device configured for locking the first panel to the second panel, wherein the first panel comprises a first edge and a first panel surface and the second panel comprises a second edge and a second panel surface, wherein the method comprises providing the first panel surface of the first panel with an insertion groove and a groove surface of the locking device by milling using a first milling tool in only a single operation.

According to an aspect the method is configured for producing the set according to the above.

According to a further aspect, provided is also a method of providing a first panel and/or a second panel with a mechanical locking device configured for locking the first panel to the second panel, wherein the first panel comprises a first edge and a first panel surface and the second panel comprises a second edge and a second panel surface, wherein the method comprises providing the second edge of the second panel with a second locking surface and an edge surface by milling using a second milling tool only, in only a single operation, and providing the second locking surface and the edge surface at opposite sides of a second tongue.

According to an aspect the method comprises the method of providing a first panel and/or a second panel with a mechanical locking device configured for locking the first panel to the second panel, wherein the first panel comprises a first edge and a first panel surface and the second panel comprises a second edge and a second panel surface, wherein the method comprises providing the first panel surface of the first panel with an insertion groove and a groove surface of the locking device by milling using a first milling tool in only a single operation, as specified above.

According to an aspect the method is configured for producing the set as specified above.

According to an aspect the core of the first panel and/or of the second panel may be a wood-based core, which may be made of MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

BRIEF DESCRIPTION OF THE DRAWINGS

These and other aspects, features and advantages of which embodiments of the disclosure are capable of, will be apparent and elucidated from the following description of embodiments and aspects of the present disclosure, reference being made to the accompanying drawings, in which FIGS. 1-3 show the first and second panel before assembling, while FIGS. 4-6 show the first and second panel in a locked position. The mechanical locking device comprises a first tongue and a groove surface at a first panel surface, and a locking groove and an edge surface at a second edge.

FIGS. 24-26 show panels with clips assembled, while FIGS. 27-29 show the panel and clips before assembly of the panel and clips.

DETAILED DESCRIPTION

Figure 1:
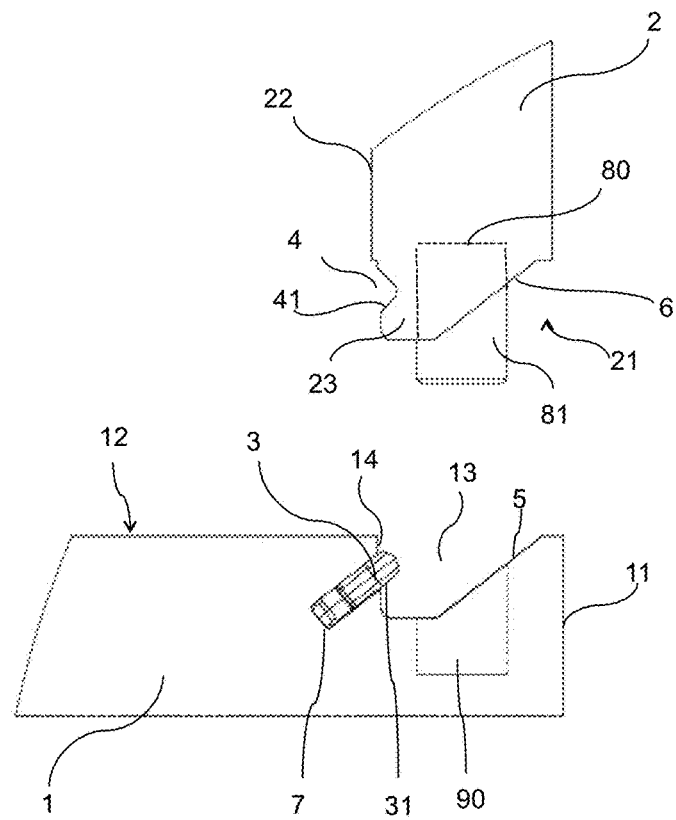
FIGS. 1-6 show a set comprising a first and second panel with a locking device, according to an illustrative embodiment of the disclosure.

Specific embodiments of the disclosure will now be described with reference to the accompanying drawings. This disclosure may, however, be embodied in many different forms and should not be construed as limited to the embodiments set forth herein. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments disclosed herein can be combined with one or more of the other aspects, alternatives and embodiments described herein. Two or more aspects can be combined.

A first illustrative embodiment is shown in FIGS. 1-10, 15-20 and 37-40, including a set of panels comprising a first panel 1 with a first main plane, a second panel 2 with a second main plane. The first panel 1 and the second panel 2 are provided with a mechanical locking device configured for locking the first panel 1 to the second panel 2. The first panel 1 comprises a first edge 11 and a first panel surface 12 and the second panel 2 comprises a second edge 21 and a second panel surface 22. The first main plane is arranged essentially perpendicular to the second main plane in a locked position of the first panel and the second panel.

The mechanical locking device comprises a panel surface groove 13 at the first panel surface 12, and a locking groove 4 and an edge surface 6 at the second edge 21. The panel surface groove 13 comprises a groove surface 5 and an opposite groove surface 14 which comprises a first tongue 3. The first tongue 3 comprises a first locking surface 31, and the locking groove 4 comprises a second locking surface 41. The first locking surface 31 is configured to interact with the second locking surface 41 in the locked position, wherein the first tongue 3 and/or the locking groove 4 is/are flexible for facilitating locking of the first panel to the second panel.

The mechanical locking device may comprise in a locked position a space 15 between the groove surface 5 and the edge surface 6.

The groove surface 5 and the edge surface 6 may be configured to be adjacent and/or opposite each other in in the locked position.

Figure 2:
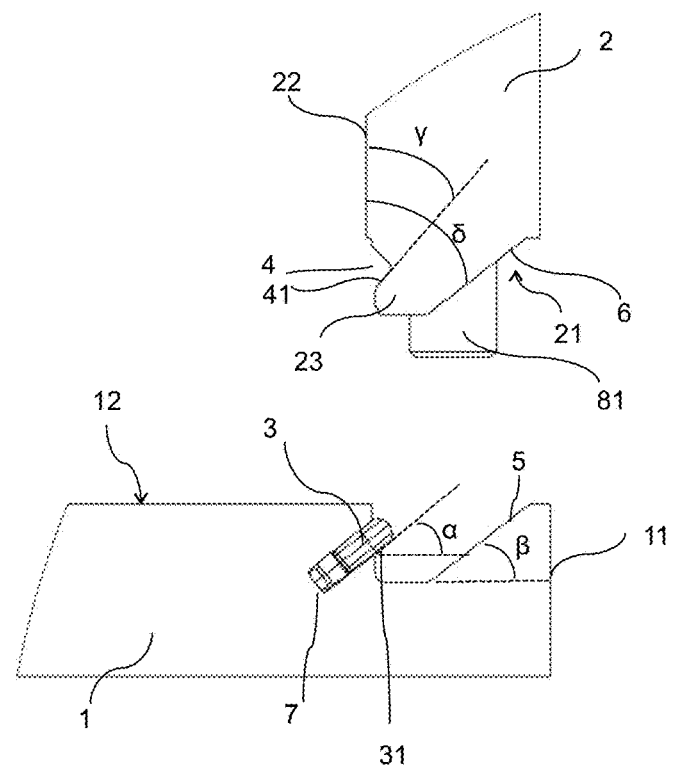
Figure 3:
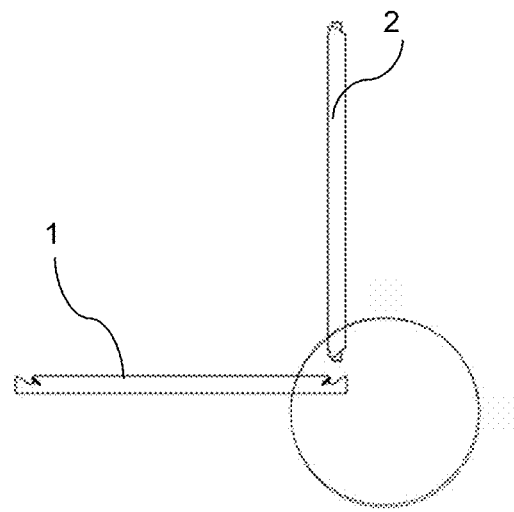
Figure 4:
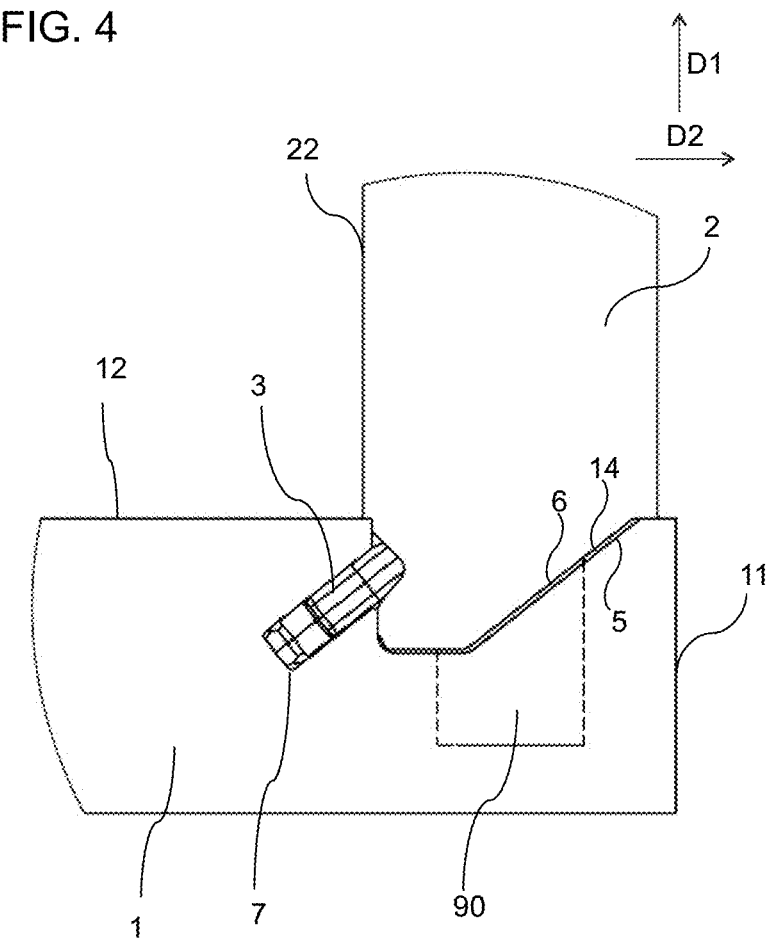
Figure 5:
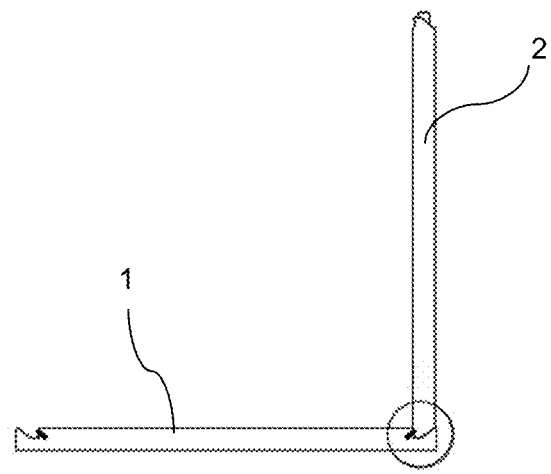
Figure 6:
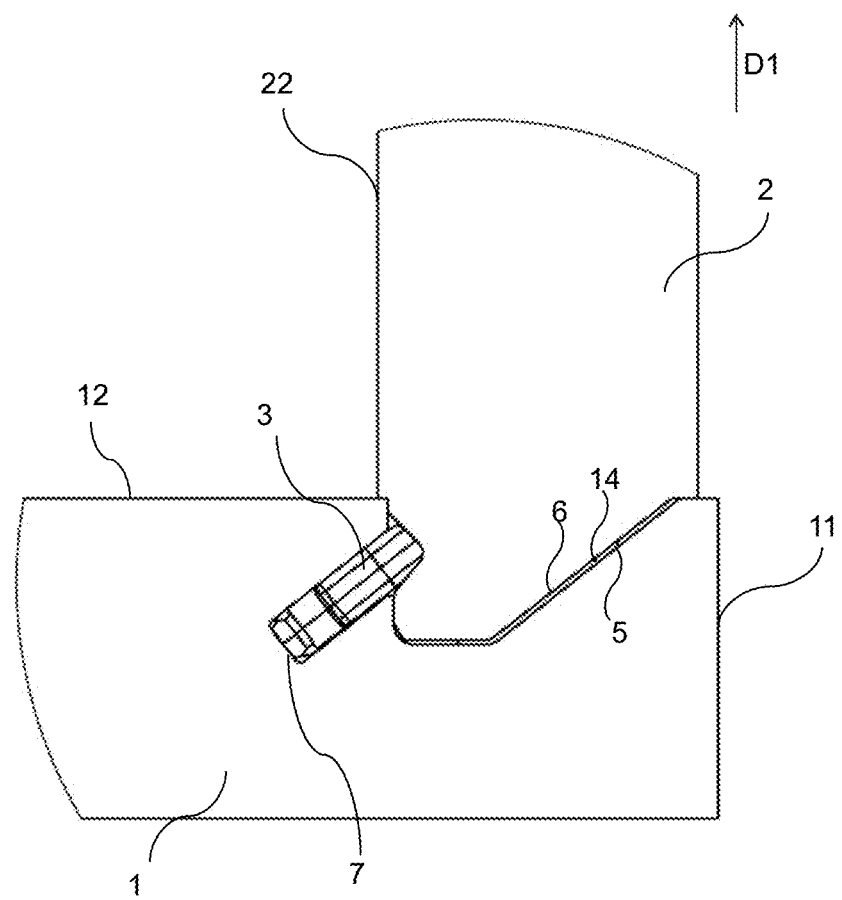
Figure 7:
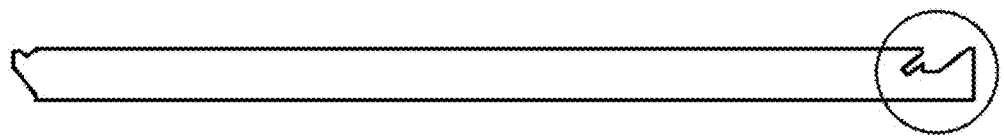
FIG. 7 shows a cross section of an embodiment of a panel according to an illustrative embodiment of the disclosure, the panel comprising a first panel surface and a first edge comprising a first tongue and a groove surface, and further comprising a second edge comprising a locking groove and an edge surface and a second locking surface.
Figure 8:
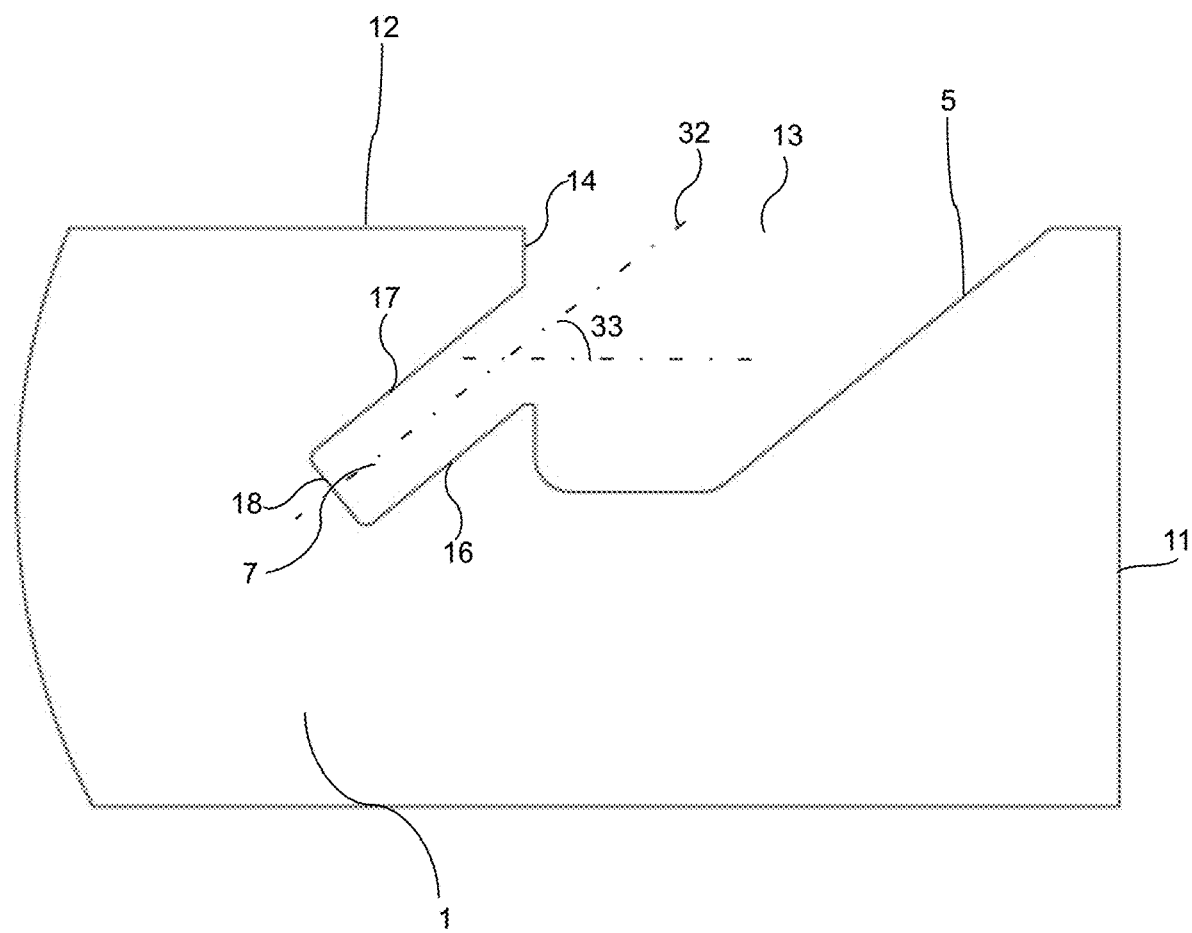
FIG. 8 shows an enlargement of part of the embodiment shown in FIG. 7, the mechanical locking device comprising a first insertion groove for positioning of a first tongue and further comprising a groove surface.
Figure 9:
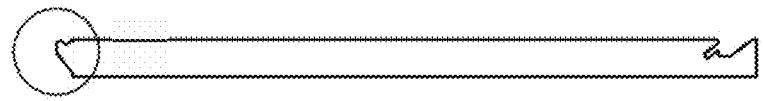
FIG. 9 shows a cross section of an illustrative embodiment of a panel according to the disclosure, the panel comprising a first panel surface and a first edge comprising a first tongue and a groove surface, and further comprising a second edge comprising a locking groove and an edge surface and a second locking surface.
Figure 10:
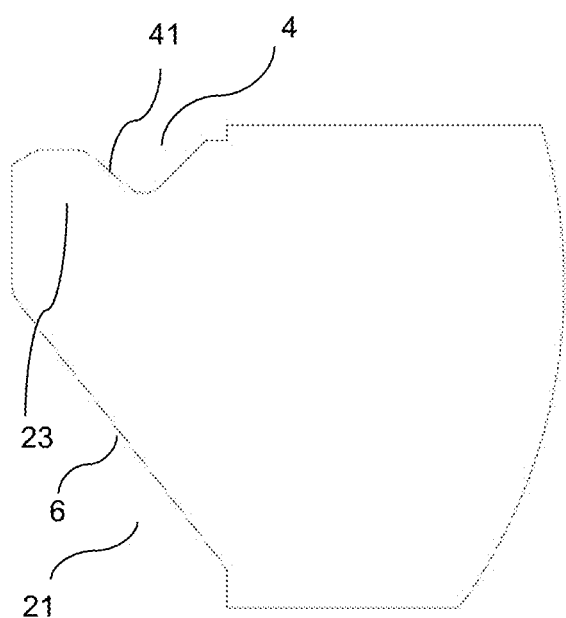
FIG. 10 shows an enlargement of part of the embodiment shown in FIG. 9, the panel comprising a second edge comprising a locking groove and an edge surface and a second locking surface.

As shown in FIG. 2, a longitudinal axis 34 of the first tongue 3 extends at a first angle $\alpha$ from the first main plane, the groove surface 5 extends at a second angle $\beta$ from the first main plane, the second locking surface 41 extends at a third angle $\gamma$ from the second main plane, and the edge surface 6 extends at a fourth angle $\delta$ from the second main plane. The first angle $\alpha$ is $\geq$ the second angle $\beta$ and/or the third angle $\gamma$ is $\leq$ the fourth angle $\delta$.

The first locking surface 31 may be configured to interact with the second locking surface 41 in the locked position for a locking in a first direction D1 which may be parallel with the second main plane.

The first edge 11 may be perpendicular to the first panel surface 12.

The first angle $\alpha$ may be within the range of about 25° to about 45°, more or within the range of about 35° to about 40°.

The second angle $\beta$ may be within the range of about 25° to about 45°, more or within the range of about 35° to about 40°.

The third angle $\gamma$ may be within the range of about 65° to about 45°, more or within the range of about 55° to about 50°.

The fourth angle $\delta$ may be within the range of about 65° to about 45°, more or within the range of about 55° to about 50°.

In an embodiment, as, e.g., shown in FIGS. 1-6, 15-17 and 33-35, the first tongue 3 of the mechanical locking device may be a flexible tongue. The first tongue 3 may be positioned in a first insertion groove 7.

The first insertion groove 7 may comprise a wall surface 16, an opposite wall surface 17 and a bottom surface 18 which extends between the wall surface 16 and the opposite wall surface 17. The flexible tongue 3 may be configured to be compressed and or displaced towards the bottom surface 18 during the locking of the first panel to the second panel and spring back towards the second locking surface 41 when the first panel and second panel have reached the locked position.

A centreline 32 may extend between the wall surface 16 and the opposite wall surface 17. The centreline 32 may extend at a centreline angle 33 from the first main plane. The centreline angle 33 may be essentially the same as the first angle ($\alpha$).

The flexible tongue 3 may have a longitudinal shape and the first insertion groove 7 may have a longitudinal shape, wherein the flexible tongue 3 is positioned in the first insertion groove 7 with its length direction parallel with the length direction of the first insertion groove 7.

The flexible tongue may be configured as shown in, e.g., FIG. 6a-7b in WO2007/015669, or FIG. 8A-D in WO2014/209213 or FIG. 11A-13B in WO2019/203720. These figures, and the corresponding disclosure in the specifications, are hereby incorporated by reference.

In an embodiment, shown in detail in FIGS. 1-2, the mechanical locking device may comprise at least one rod-shaped element 81 in the panel surface groove 13 in the first panel surface 12 and/or at the second edge 21, and at least one second insertion groove 90 at the opposite first panel surface 12 and/or the opposite second edge 21. The rod-shaped element 81 is configured to be inserted into the second insertion groove 90 in the locked position. This can result in an increased stability of the set of panels after assembly. The rod-shaped element 81 may be arranged in a rod element groove 80.

The rod-shaped element 81 may be configured to interact with the second insertion groove 90 for a locking in a second direction D2 which may be perpendicular to the first direction.

The rod element groove 80 may be a drill hole. In an embodiment the drill hole is a bottom-ended drill hole.

The insertion groove 90 may be a drill hole. In an embodiment the drill hole is a bottom-ended drill hole.

The groove surface 5, the edge surface 6 and/or the second locking surface 41 may be a milled surface.

In an embodiment, a difference between the first angle α and the second angle β may be between 0° and 10°.

In an embodiment, a difference between the third angle γ and the fourth angle δ may be between 0° and 10°.

Figure 11:
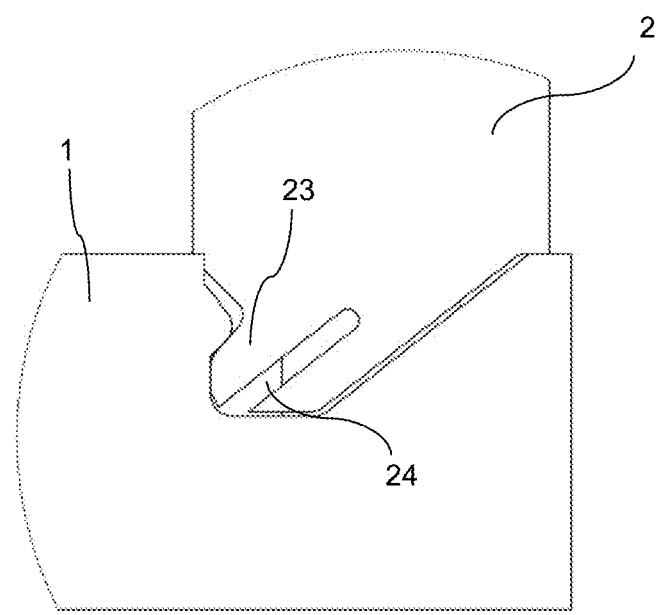
FIG. 11 shows an enlargement of a set comprising a first and second panel with a locking device, according to an illustrative embodiment of the disclosure. The second edge of the second panel comprises a second tongue comprising a flexing groove.

The second edge 21 of the second panel 2 may comprise a second tongue 23. The second tongue 23 may comprise a flexing groove 24, as shown in FIG. 11. This facilitates steering of the first panel 1 and the second panel 2 into the correct locked position during assembly.

According to an aspect, as shown in FIGS. 24-36I, the second edge 21 of the second panel 2 is not provided with a second locking surface 41 and an edge surface 6 by milling. The second edge 21 of the second panel 2 may according to this aspect be provided with a clip 300. The clip 300 may be provided with a locking groove 4 comprising a second locking surface 41, an edge surface 6, and a rod-shaped element 81. The clip 300 may further be provided with a connecting element 302 for connecting the clip 300 to the panel. The second panel 2 may according to one aspect be provided with one or more connecting groove 301 for receiving the connecting element 302. The connecting element 302 may be glued in the connecting groove 301.

Figure 24:
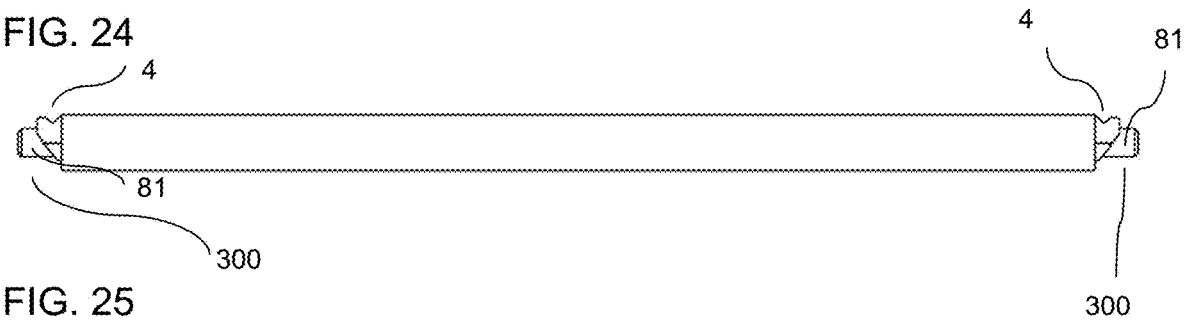
FIGS. 24-29 show different views of a panel according to an illustrative embodiment of the disclosure. The panel comprises two of a second edge, comprising at least one clip comprising a locking groove and an edge surface and a second locking surface.
Figure 25:
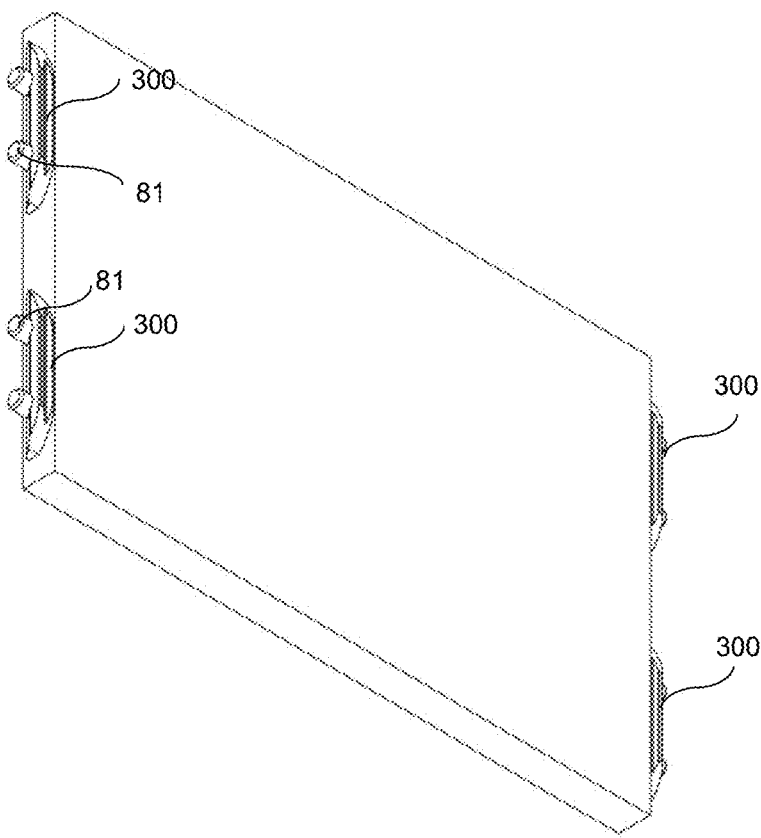
Figure 26:
Figure 27:
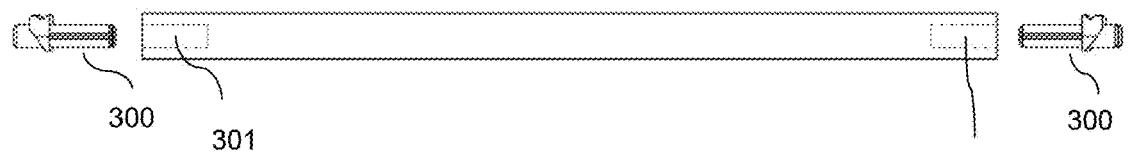
Figure 28:
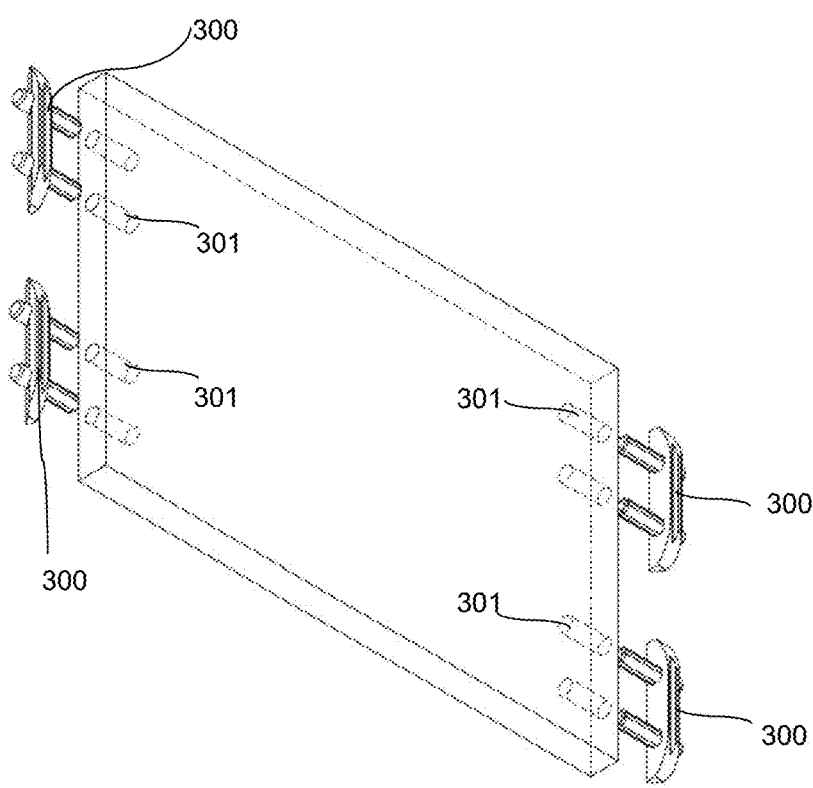
Figure 29:
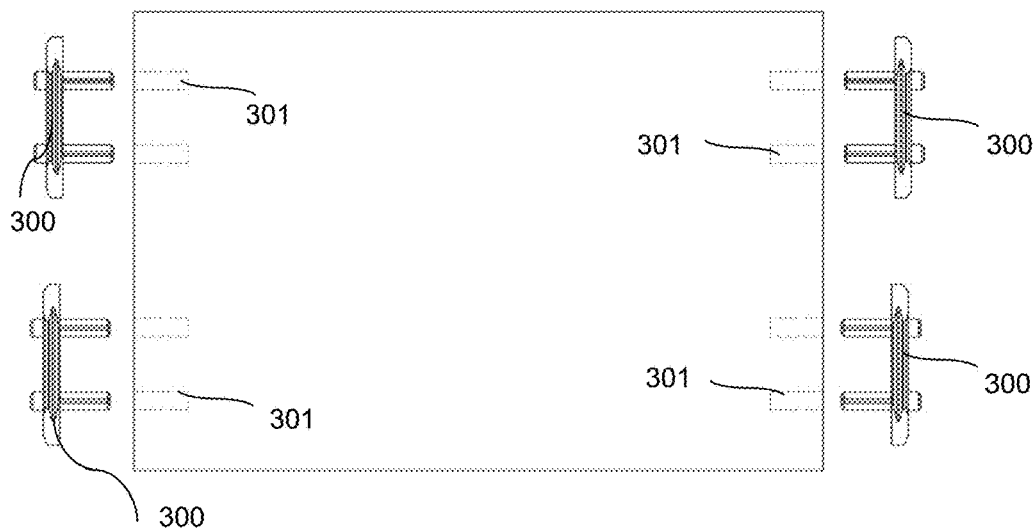
Figure 30:
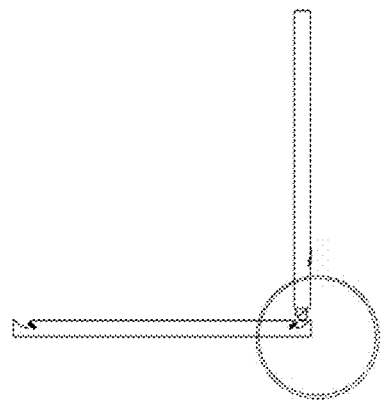
FIGS. 30-32 show different views of a set of panels according to an illustrative embodiment of the disclosure before assembly. At least one clip is assembled with the second panel.
Figure 31:
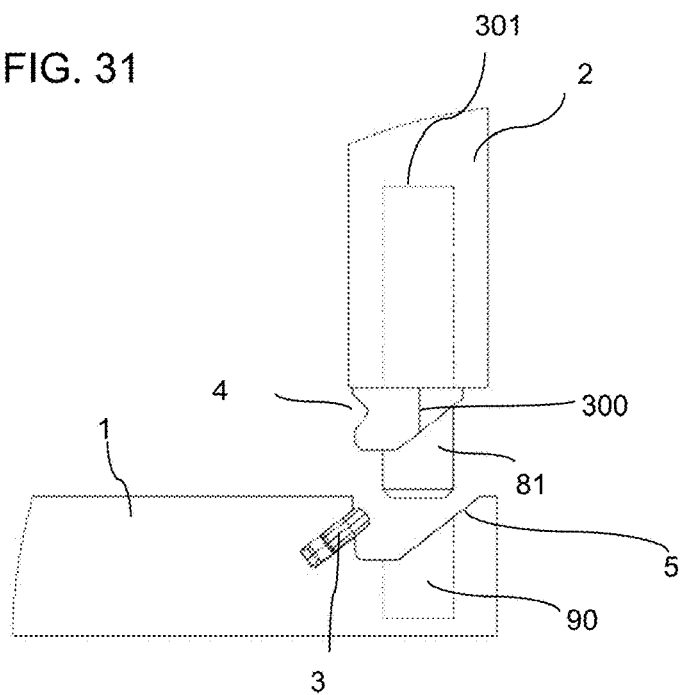
Figure 32:
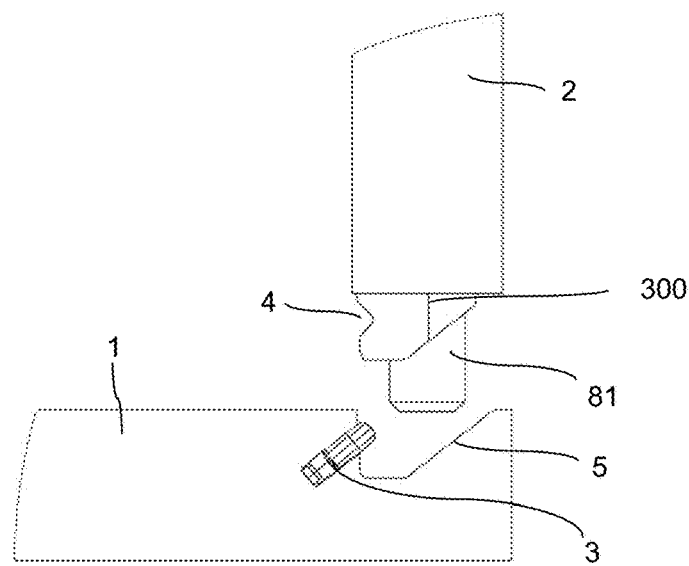
Figure 33:
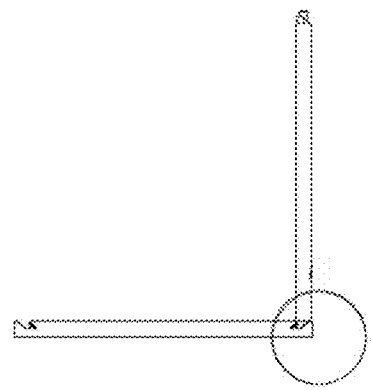
FIGS. 33-35 show different views of a set of panels according to an illustrative embodiment of the disclosure after assembly. At least one clip is assembled with the second panel.
Figure 34:
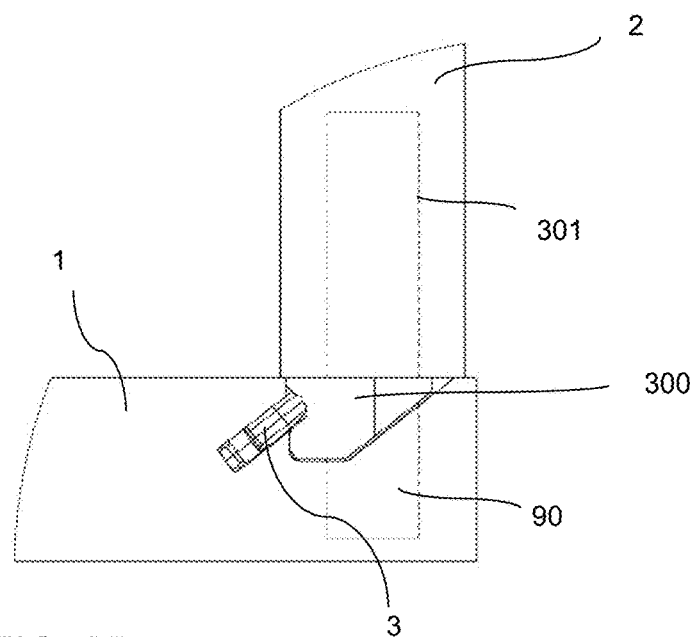
Figure 35:
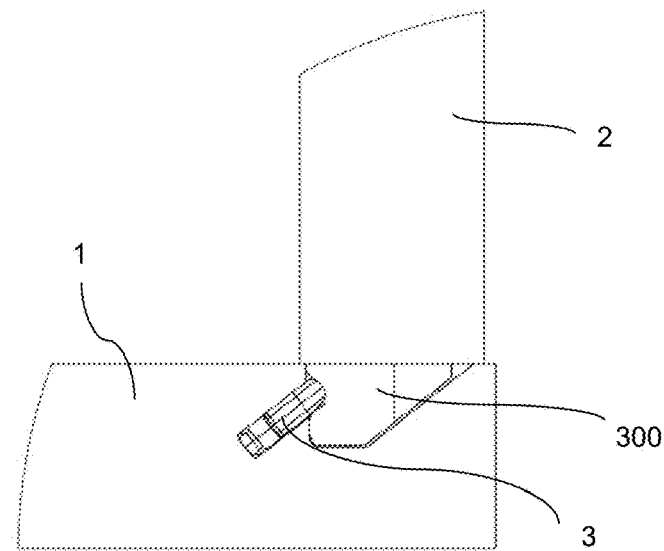
Figure 36A:
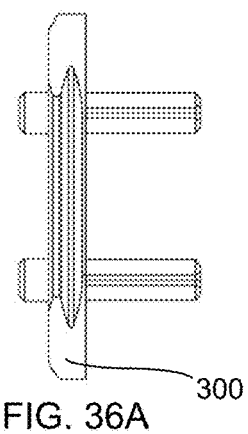
FIGS. 36A-36I show different views of a clip according to an illustrative embodiment of the disclosure.
Figure 36B:
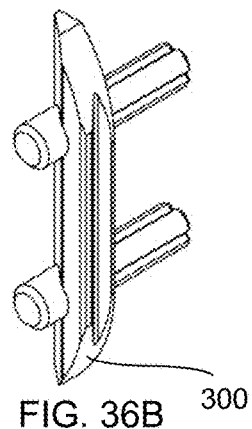
Figure 36C:
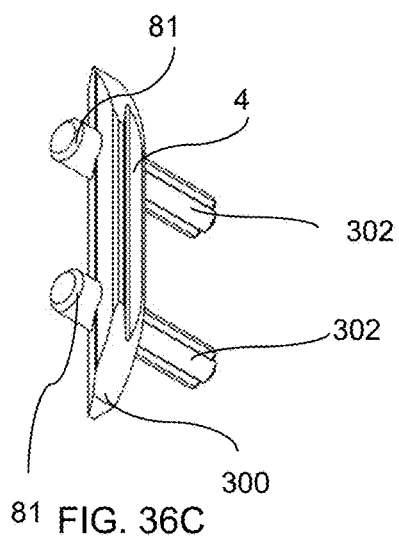
Figure 36D:
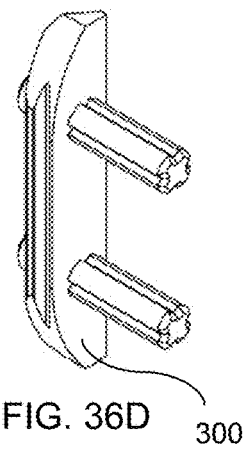
Figure 36E:
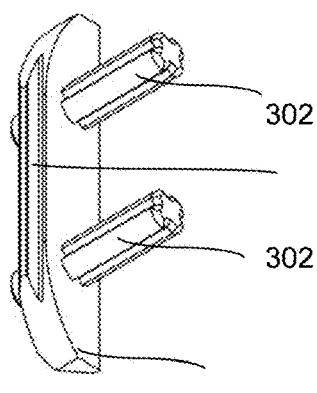
Figure 36F:
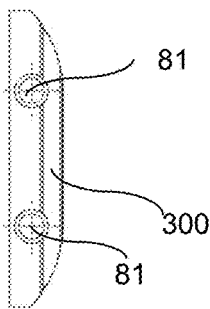
Figure 36G:
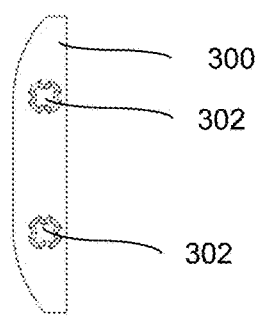
Figure 36H:
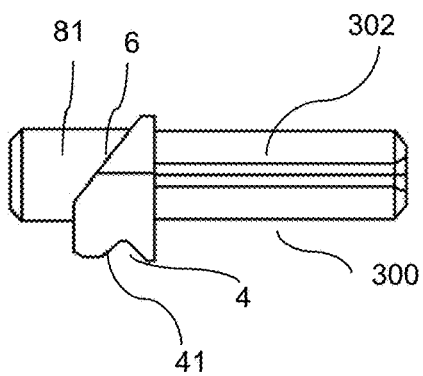
Figure 36I:
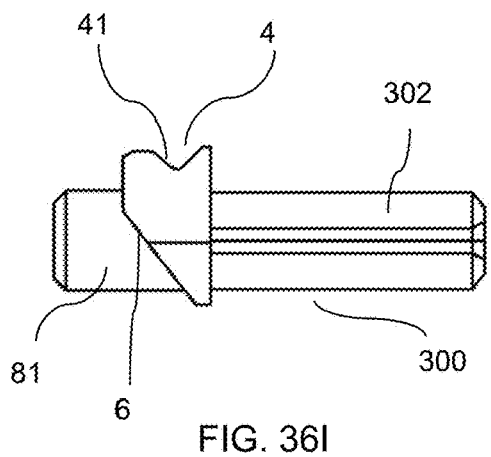
Figure 37:
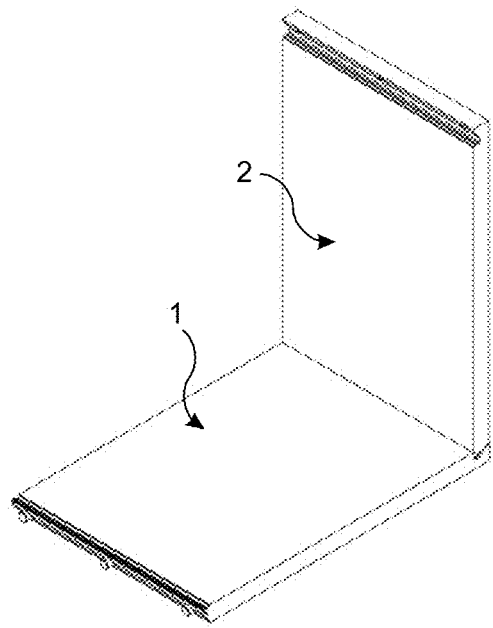
FIGS. 37-40 show different views of a set of a first and a second panel according to an illustrative embodiment of the disclosure after assembly.
Figure 38:
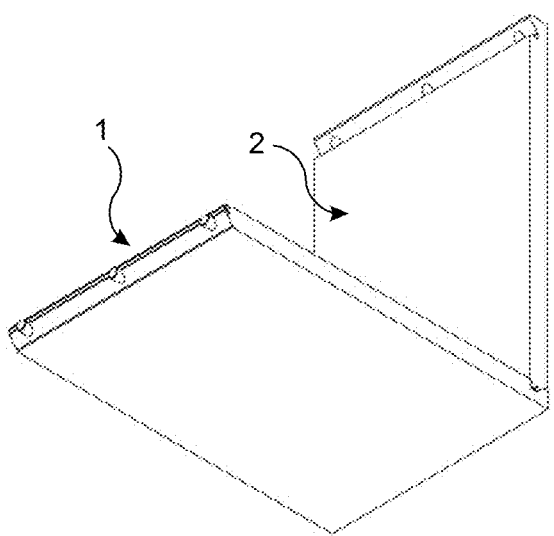
Figure 39:
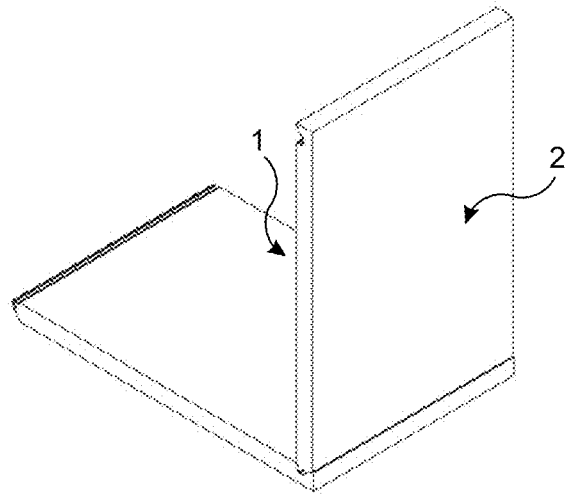
Figure 40:
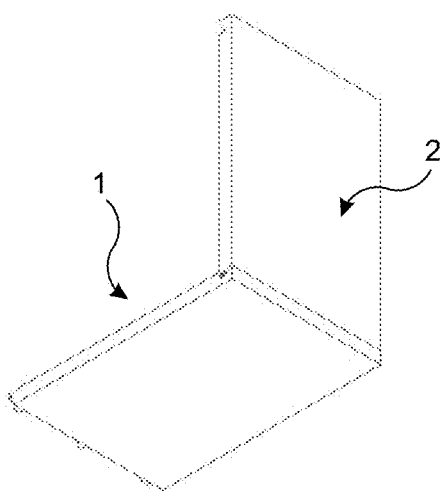

FIGS. 24-26 show the second panel 2 with clips 300 assembled, while FIGS. 27-29 show the second panel 2 and clips 300 before assembly. FIGS. 36A-36I show detailed views of the clip 300. According to one aspect the clip 300 may be made of plastic or metal.

Figure 12:
FIG. 12 shows a cross section of a first and second milling tool when providing a first and/or second edge according to an illustrative embodiment of the disclosure.
Figure 13:
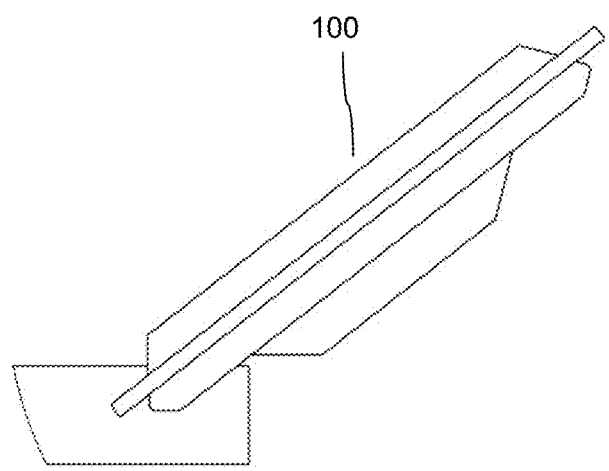
FIG. 13 shows an enlargement of part of the embodiment shown in FIG. 12, comprising a first milling tool according to an illustrative embodiment of the disclosure.

According to an aspect, the present disclosure also relates to a method of providing a first panel 1 and/or a second panel 2 with a mechanical locking device configured for locking the first panel 1 to the second panel 2. The first panel 1 comprises a first edge 11 and a first panel surface 12 and the second panel 2 comprises a second edge 21 and a second panel surface 22. The method comprises providing the first panel surface 12 of the first panel 1 with an insertion groove 7 and a groove surface 5 of the locking device by milling. The milling is conducted using a first milling tool 100 in only a single operation. This can result in the production of panels, comprising a locking device, that is easy and quick to produce and may result in reduced production costs. Furthermore, the production tolerances of the locking profile may be improved. The first milling tool 100 and the use thereof is shown in FIGS. 12-13.

The method may be configured for producing the set of panels according to the disclosure as described above.

Figure 14:
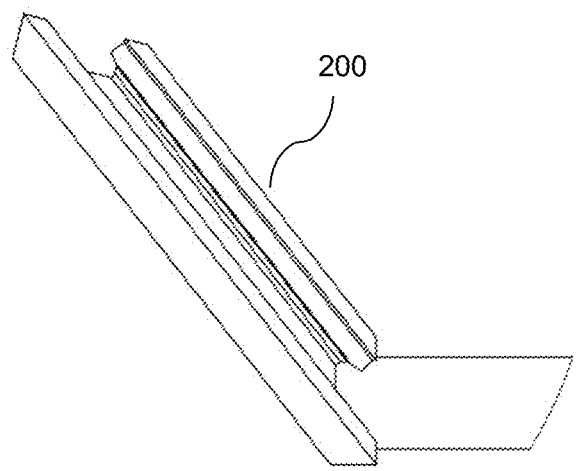
FIG. 14 shows an enlargement of part of the embodiment shown in FIG. 12, comprising a second milling tool according to an illustrative embodiment of the disclosure.
Figure 15:
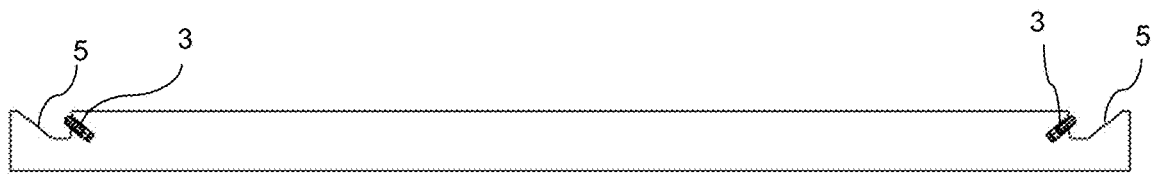
FIGS. 15-17 show different views of a panel according to an illustrative embodiment of the disclosure. The panel comprises a first panel surface and two of a first edge, each first edge comprising a first tongue and a groove surface.
Figure 16:
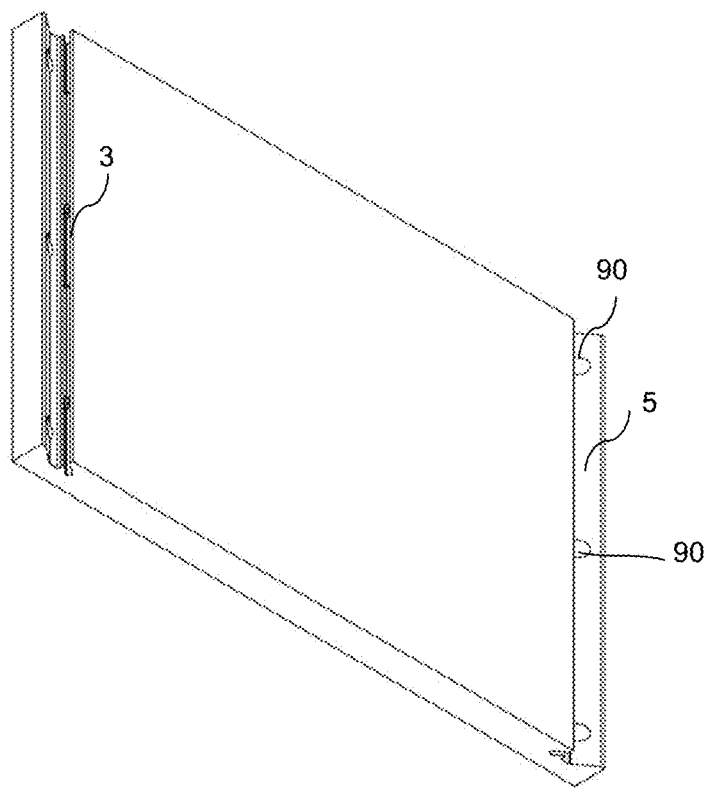
Figure 17:
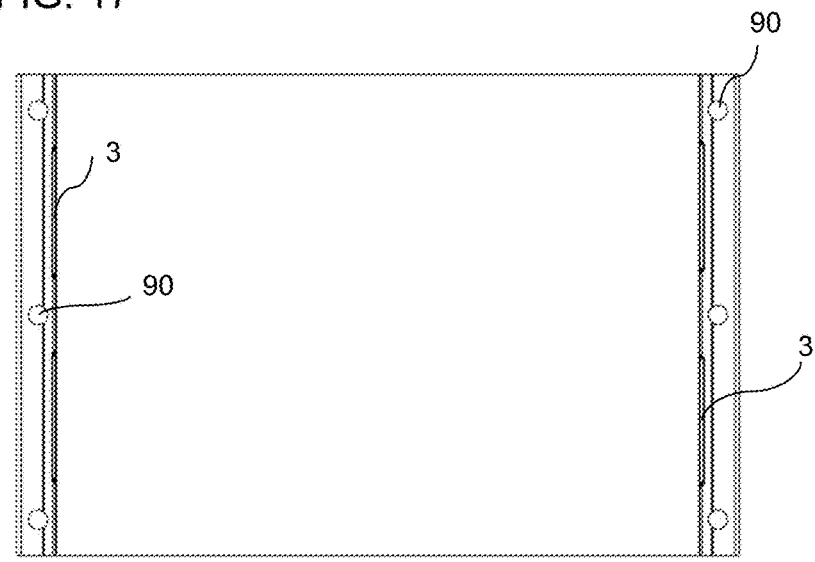
Figure 18:
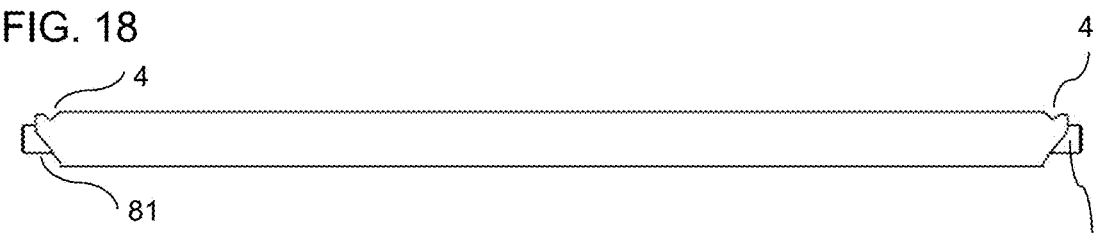
FIGS. 18-20 show different views of a panel according to an illustrative embodiment of the disclosure. The panel comprises two of a second edge, each second edge comprising a locking groove and an edge surface and a second locking surface.
Figure 19:
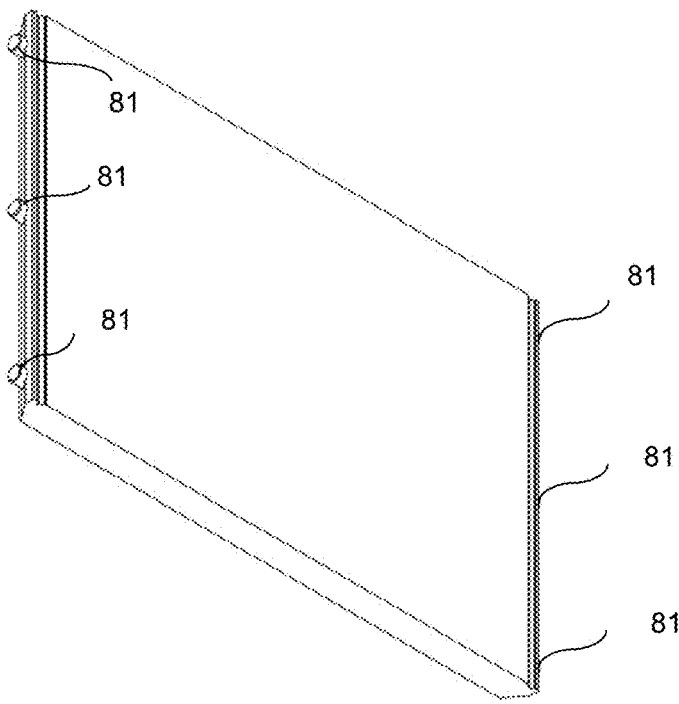
Figure 20:
Figure 21:
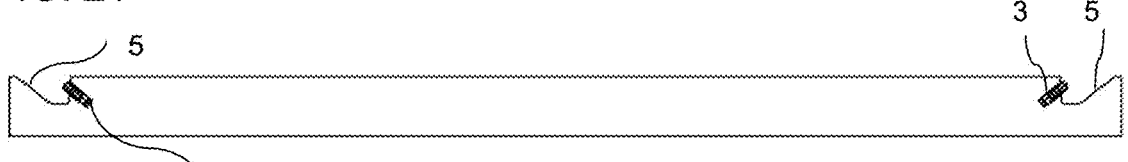
FIGS. 21-23 show different views of a panel according to an illustrative embodiment of the disclosure. The panel comprises a first panel surface and two of a first edge, each first edge comprising a first tongue and a groove surface. The insertion grooves are positioned to be able to connect with at least one clip.
Figure 22:
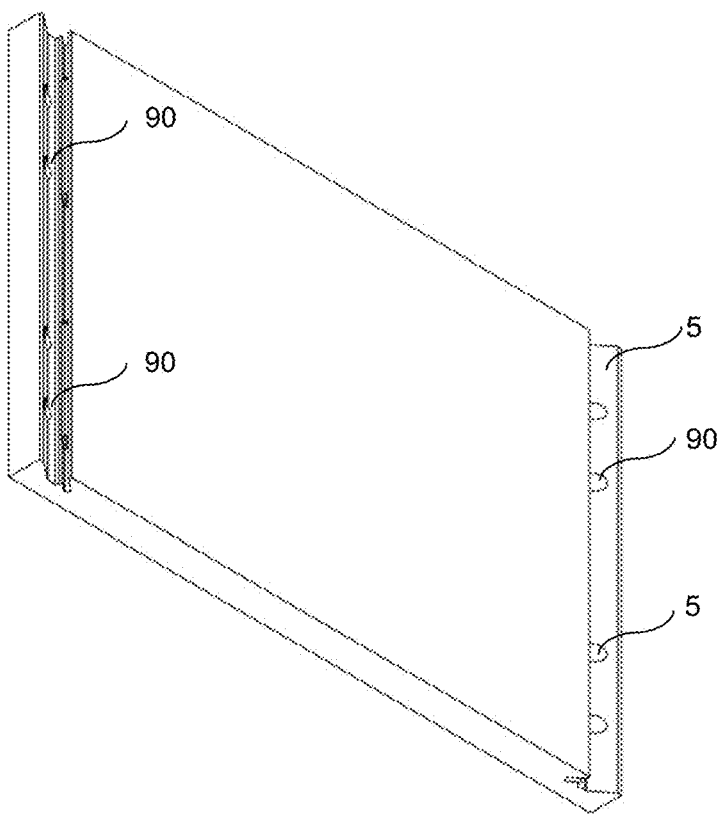
Figure 23:

According to an aspect, the present disclosure also relates to a method of providing a first panel 1 and/or a second panel 2 with a mechanical locking device configured for locking the first panel 1 to the second panel 2. The first panel 1 comprises a first edge 11 and a first panel surface 12 and the second panel 2 comprises a second edge 21 and a second panel surface 22. The method comprises providing the second edge 21 of the second panel 2 with a second locking surface 41 and an edge surface 6 by milling. The milling is done using a second milling tool 200 only, in only a single operation. The method further comprises providing the second locking surface 41 and the edge surface 6 at opposite sides of a second tongue 23. The second milling tool 200 and the use thereof is shown in FIGS. 12 and 14.

In an embodiment, this method may comprise the method as described above. The method may be configured for producing the set of panels according to the present disclosure as described above.

The first panel 1 and/or the second 2 panel may comprise one or more of said first edges 11. The first panel 1 and/or the second 2 panel may comprise one or more of said second edges 21. A panel comprising one of said first edge 11 and one of said second edge 21 is shown, e.g., in FIGS. 7 and 9. A panel comprising two of said first edges 11 is, e.g., shown in FIGS. 15-17 and 21-23, and a panel comprising two of said second edges 21 is, e.g., shown in FIGS. 18-20.

According to an embodiment, four panels each comprising a first edge 11 and a second edge 21 may be assembled into a furniture product.

According to an embodiment four panels may be assembled to form a furniture product, e.g., a furniture frame. The furniture product may comprise two panels, each comprising two of said first edges 11, and another two panels, each comprising two of said second edges 21, may be assembled into a furniture product.

The core of the first panel 1 and/or of the second panel 2 may be a wood-based core, which may be made of MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel 1 and/or the second panel 2 may also be of solid wood.

The first panel 1 and/or the second panel 2 may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil may be printed, for example by direct printing, rotogravure, or digital printing. According to an aspect the decorative layer comprise melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above could be combined with one or more of the other described aspects, embodiments and alternatives.

Further embodiments of the disclosure are described below:

1. A set comprising a first panel 1 with a first main plane, a second panel 2 with a second main plane and a mechanical locking device configured for locking the first panel 1 to the second panel 2, wherein the first panel 1 comprises a first edge 11 and a first panel surface 12 and the second panel 2 comprises a second edge 21 and a second panel surface 22, and the first main plane is arranged essentially perpendicular to the second main plane in a locked position of the first panel and the second panel, wherein
   the mechanical locking device comprises a first tongue 3 and a groove surface 5 in a panel surface groove 13 in the first panel surface 12, and a locking groove 4 and an edge surface 6 at the second edge 21,
   the first tongue 3 comprises a first locking surface 31,
   the locking groove 4 comprises a second locking surface 41,
   the first locking surface 31 is configured to interact with the second locking surface 41 in the locked position, wherein the first tongue 3 and/or the locking groove 4 is/are flexible for facilitating locking of the first panel to the second panel,
   a longitudinal axis 34 of the first tongue 3 extends at a first angle α from the first main plane,
   the groove surface 5 extends at a second angle β from the first main plane,
   the second locking surface 41 extends at a third angle γ from the second main plane,
   the edge surface 6 extends at a fourth angle δ from the second main plane,
   and wherein the first angle α is greater the second angle β and/or the third angle γ is smaller the fourth angle δ.

2. The set as described in embodiment 1, wherein the first angle α is within the range of about 25° to about 45°, or within the range of about 35° to about 40°.

3. The set as described in embodiment 1 or embodiment 2, wherein the second angle β is within the range of about 25° to about 45°, or within the range of about 35° to about 40°.

4. The set as described in any one of the previous embodiments, wherein the third angle γ is within the range of about 65° to about 45°, or within the range of about 55° to about 50°.

5. The set as described in any one of the previous embodiments, wherein the fourth angle δ is within the range of about 65° to about 45°, or within the range of about 55° to about 50°.

6. The set as described in any one of the previous embodiments, wherein the first tongue 3 is a flexible tongue.

7. The set as described in any one of the previous embodiments, wherein the first tongue 3 is positioned in a first insertion groove 7.

8. The set as described in any one of the previous embodiments, wherein the mechanical locking device further comprises at least one rod-shaped element 81 in the panel surface groove 13 in the first panel surface 12 and/or at the second edge 21, and at least one second insertion groove 90 at the opposite first panel surface 12 and/or the opposite second edge 21, and wherein the rod-shaped element 81 is configured to be inserted into the second insertion groove 90 in the locked position.

9. The set as described in embodiment 8, wherein the rod-shaped element 81 is arranged in a rod element groove 80.

10. The set as described in embodiment 9, wherein the rod element groove 80 is a drill hole.

11. The set as described in any one of embodiments 8 to 10, wherein the second insertion groove 90 is a drill hole.

12. The set as described in embodiment 10 or embodiment 11, wherein the drill hole is a bottom-ended drill hole.

13. The set as described in any one of the previous embodiments, wherein the groove surface 5, the edge surface 6 and/or the second locking surface 41 is/are a milled surface.

14. The set as described in any one of the previous embodiments, wherein a difference between the first angle α and the second angle β is between 0° and 10°.

15. The set as described in any one of the previous embodiments, wherein a difference between the third angle γ and the fourth angle δ is between 0° and 10°.

16. The set as described in any one of the previous embodiments, wherein the second edge 21 of the second panel 2 comprises a second tongue 23 and wherein the second tongue 23 comprises a flexing groove 24.

17. A method of providing a first panel 1 and/or a second panel 2 with a mechanical locking device configured for locking the first panel 1 to the second panel 2, wherein the first panel 1 comprises a first edge 11 and a first panel surface 12 and the second panel 2 comprises a second edge 21 and a second panel surface 22, wherein the method comprises
   providing the first panel surface 12 of the first panel 1 with an insertion groove 7 and a groove surface 5 of the locking device by milling using a first milling tool 100 in only a single operation.

18. The method as described in embodiment 17, configured for producing the set according to any one of the embodiments 1 to 16.

19. A method of providing a first panel 1 and/or a second panel 2 with a mechanical locking device configured for locking the first panel 1 to the second panel 2, wherein the first panel 1 comprises a first edge 11 and a first panel surface 12 and the second panel 2 comprises a second edge 21 and a second panel surface 22, wherein the method comprises
   providing the second edge 21 of the second panel 2 with a second locking surface 41 and an edge surface 6 by milling using a second milling tool 200 only, in only a single operation, and
   providing the second locking surface 41 and the edge surface 6 at opposite sides of a second tongue 23.

20. The method as described in embodiment 19, wherein the method comprises the method according to embodiment 17.

21. The method as described in embodiment 19 or 20, configured for producing the set according to any one of the embodiments 1 to 16.

The invention claimed is:

1. A set comprising a first panel with a first main plane, a second panel with a second main plane and a mechanical locking device configured for locking the first panel to the second panel, wherein the first panel comprises a first edge and a first panel surface and the second panel comprises a second edge and a second panel surface, the first main plane comprising the first panel surface and the second main plane comprising the second panel surface, and the first main plane is arranged essentially perpendicular to the second main plane in a locked position of the first panel and the second panel, wherein:
   the mechanical locking device comprises a panel surface groove at the first panel surface, and a locking groove and an edge surface at the second edge,
   the panel surface groove comprises a groove surface and an opposite groove surface which comprises a first tongue,
   the first tongue comprises a first locking surface and is configured such that at least a portion of the first tongue is displaced back and forth along a longitudinal axis of the first tongue during the locking of the first panel to the second panel, the locking groove comprises a second locking surface, the first locking surface is configured to interact with the second locking surface in the locked position, wherein the first tongue is flexible for facilitating locking of the first panel to the second panel, the longitudinal axis of the first tongue extends at an acute first angle from the first main plane, the groove surface extends at a second angle from the first main plane, the second locking surface extends at a third angle from the second main plane, the edge surface extends at a fourth angle from the second main plane, and the first angle is greater than the second angle.

2. The set as claimed in claim 1, wherein the first angle is within the range of about 25° to about 45°.

3. The set as claimed in claim 1, wherein the second angle is within the range of about 25° to about 45°.

4. The set as claimed in claim 1, wherein the third angle is within the range of about 65° to about 45°.

5. The set as claimed in claim 1, wherein the fourth angle is within the range of about 65° to about 45°.

6. The set as claimed in claim 1, wherein the first tongue is positioned in a first insertion groove.

7. The set as claimed in claim 6, wherein the first tongue is a flexible tongue configured such that the at least a portion of the first tongue is displaced towards a bottom surface of a first insertion groove during the locking of the first panel to the second panel and springs back toward the second locking surface when the first and second panels have reached the locked position.

8. The set as claimed in claim 1,
wherein the mechanical locking device further comprises at least one rod-shaped element and at least one insertion groove,
wherein either the at least one rod-shaped element is located at the first panel surface and the at least one insertion groove is located at the second edge, or the at least one rod-shaped element is located at the second edge and the at least one insertion groove is located at the first panel surface, and
wherein the rod-shaped element is configured to be inserted into the insertion groove in the locked position.

9. The set as claimed in claim 8, wherein each of the at least one rod-shaped element is arranged in a respective rod element groove.

10. The set as claimed in claim 9, wherein the respective rod element groove is a drill hole.

11. The set as claimed in claim 8, wherein the at least one insertion groove is a drill hole.

12. The set as claimed in claim 10, wherein the drill hole is a bottom-ended drill hole.

13. The set as claimed in claim 1, wherein the groove surface, the edge surface and/or the second locking surface is/are a milled surface.

14. The set as claimed in claim 1, wherein a difference between the first angle and the second angle is less than 10°.

15. The set as claimed in claim 1, wherein the third angle is smaller the fourth angle.

16. The set as claimed in claim 15, wherein a difference between the third angle and the fourth angle is less than 10°.

17. The set as claimed in claim 1, wherein the second edge of the second panel comprises a second tongue and wherein the second tongue comprises a flexing groove.

18. The set as claimed in claim 1, wherein first tongue is compressed during the locking of the first panel to the second panel.

19. A method of providing a mechanical locking device configured for locking a first panel to a second panel, wherein the first panel comprises a first edge and a first panel surface and the second panel comprises a second edge and a second panel surface, wherein the method comprises:
providing the first panel; and
providing the first panel with an insertion groove and a groove surface of the locking device by milling using a first milling tool in only a single operation,
wherein, as a result of the providing of the first panel surface with the insertion groove and the groove surface, the first panel comprises a panel surface groove at the first panel surface, the panel surface groove comprising the groove surface and an opposite groove surface which comprises the insertion groove, the insertion groove extending from the opposite groove surface into the first panel.

20. The method as claimed in claim 19, further comprising the second panel, wherein a first main plane comprises the first panel surface and a second main plane comprises the second panel surface, and the first main plane is arranged essentially perpendicular to the second main plane in a locked position of the first panel and the second panel,
wherein a first tongue is arranged in the insertion groove, wherein:
the mechanical locking device comprises the panel surface groove at the first panel surface, and a locking groove and an edge surface at the second edge,
the first tongue comprises a first locking surface,
the locking groove comprises a second locking surface,
the first locking surface is configured to interact with the second locking surface in the locked position, wherein the first tongue is flexible for facilitating locking of the first panel to the second panel,
a longitudinal axis of the first tongue extends at a first angle from the first main plane,
the groove surface extends at a second angle from the first main plane,
the second locking surface extends at a third angle from the second main plane,
the edge surface extends at a fourth angle from the second main plane, and
the first angle is greater than the second angle.

21. A method of providing a mechanical locking device configured for locking a first panel to a second panel, wherein the first panel comprises a first edge and a first panel surface and the second panel comprises a second edge and a second panel surface, wherein the method comprises:
providing the second panel; and
providing a second tongue the second edge of the second panel with an edge surface, and a locking groove comprising a second locking surface, at opposite sides of the second tongue, by milling using a milling tool only, in only a single operation.

22. The method as claimed in claim 21, further comprising:
providing the first panel;
providing the first panel surface of the first panel with an insertion groove and a groove surface of the mechanical locking device by milling using another milling tool in only a single operation.

23. The method as claimed in claim 21, further comprising providing the first panel, wherein a first main plane comprises the first panel surface and a second main plane comprises the second panel surface, and the first main plane is arranged essentially perpendicular to the second main plane in a locked position of the first panel and the second panel, wherein:
- the mechanical locking device comprises a panel surface groove at the first panel surface, and the locking groove and the edge surface at the second edge,
- the panel surface groove comprises a groove surface and an opposite groove surface which comprises a first tongue,
- the first tongue comprises a first locking surface,
- the first locking surface is configured to interact with the second locking surface in the locked position, wherein the first tongue is flexible for facilitating locking of the first panel to the second panel,
- a longitudinal axis of the first tongue extends at a first angle from the first main plane,
- the groove surface extends at a second angle from the first main plane,
- the second locking surface extends at a third angle from the second main plane,
- the edge surface extends at a fourth angle from the second main plane, and
- the first angle is greater than the second angle.

* * * * *

UNITED STATES PATENT AND TRADEMARK OFFICE
CERTIFICATE OF CORRECTION

| | | |
|---|---|---|
| PATENT NO. | : 12,038,029 B2 | Page 1 of 1 |
| APPLICATION NO. | : 17/370521 | |
| DATED | : July 16, 2024 | |
| INVENTOR(S) | : Christian Boo | |

It is certified that error appears in the above-identified patent and that said Letters Patent is hereby corrected as shown below:

In the Claims

Column 12, Line 53, Claim 22:
"""a second tongue the second edge"""

Should read:
-- a second tongue at the second edge --

Signed and Sealed this
Eighth Day of April, 2025

Coke Morgan Stewart
*Acting Director of the United States Patent and Trademark Office*